US007966178B2

(12) United States Patent
Gustavsson

(10) Patent No.: US 7,966,178 B2
(45) Date of Patent: Jun. 21, 2011

(54) DEVICE AND METHOD FOR VOICE ACTIVITY DETECTION BASED ON THE DIRECTION FROM WHICH SOUND SIGNALS EMANATE

(75) Inventor: Stefan Gustavsson, Kitchener (CA)

(73) Assignee: Sony Ericsson Mobile Communications AB, Lund (SE)

( * ) Notice: Subject to any disclaimer, the term of this patent is extended or adjusted under 35 U.S.C. 154(b) by 604 days.

(21) Appl. No.: 10/561,383

(22) PCT Filed: Jun. 8, 2004

(86) PCT No.: PCT/EP2004/051059

§ 371 (c)(1),
(2), (4) Date: Nov. 26, 2007

(87) PCT Pub. No.: WO2004/111995

PCT Pub. Date: Dec. 23, 2004

(65) Prior Publication Data

US 2008/0091421 A1 Apr. 17, 2008

Related U.S. Application Data

(60) Provisional application No. 60/480,876, filed on Jun. 24, 2003.

(30) Foreign Application Priority Data

Jun. 17, 2003 (EP) .................................... 03445076

(51) Int. Cl.
*G10L 15/20* (2006.01)

(52) U.S. Cl. ....................................................... 704/233

(58) Field of Classification Search .................. 704/233; 381/92
See application file for complete search history.

(56) References Cited

U.S. PATENT DOCUMENTS

| | | | | |
|---|---|---|---|---|
| 5,444,617 | A * | 8/1995 | Merialdo | 704/9 |
| 5,568,383 | A * | 10/1996 | Johnson et al. | 704/2 |
| 5,619,709 | A * | 4/1997 | Caid et al. | 715/209 |
| 5,634,084 | A * | 5/1997 | Malsheen et al. | 704/260 |
| 5,774,859 | A * | 6/1998 | Houser et al. | 704/275 |
| 5,848,170 | A * | 12/1998 | Mahieux et al. | 381/92 |
| 5,917,944 | A * | 6/1999 | Wakisaka et al. | 382/190 |
| 6,148,089 | A * | 11/2000 | Akino | 381/356 |
| 6,148,105 | A * | 11/2000 | Wakisaka et al. | 382/190 |
| 6,161,082 | A * | 12/2000 | Goldberg et al. | 704/3 |
| 6,283,760 | B1 * | 9/2001 | Wakamoto | 434/156 |
| 6,532,446 | B1 * | 3/2003 | King | 704/270.1 |
| 2002/0009203 | A1 | 1/2002 | Erten | 381/92 |
| 2003/0027600 | A1 | 2/2003 | Krasny et al. | 455/564 |
| 2003/0125959 | A1 * | 7/2003 | Palmquist | 704/277 |

FOREIGN PATENT DOCUMENTS

EP 1 206 161 A1 5/2002

OTHER PUBLICATIONS

International Search Report dated Sep. 15, 2004, corresponding to PCT Application No. PCT/EP2004/051059.

* cited by examiner

*Primary Examiner* — Michael N Opsasnick

(74) *Attorney, Agent, or Firm* — Myers Bigel Sibley & Sajovec, P.A.

(57) ABSTRACT

A device includes a sound signal analyser configured to determine whether a sound signal comprises speech. The device further includes a microphone system configured to discriminate sounds emanating from sources located in different directions from the microphone system so that sounds only emanating from a range of directions are included as signals possibly containing speech.

23 Claims, 1 Drawing Sheet

DEVICE AND METHOD FOR VOICE ACTIVITY DETECTION BASED ON THE DIRECTION FROM WHICH SOUND SIGNALS EMANATE

RELATED APPLICATIONS

The present application is a 35 U.S.C. §371 national phase application of PCT International Application No. PCT/EP2004/051059, having an international filing date of Jun. 8, 2004 and claiming priority to European Patent Application No. 03445076.7, filed Jun. 17, 2003 and U.S. Provisional Application No. 60/480,876 filed Jun. 24, 2003 the disclosures of which are incorporated herein by reference in their entireties. The above PCT International Application was published in the English language and has International Publication No. WO 2004/111995 A1.

FIELD OF THE INVENTION

State of the Art

Voice activity detectors are used e.g. in mobile phones to enhance the performance in certain situations. The most common way to construct a voice activity detector is to look at the levels of the sub-bands of the incoming signal. Then the background noise level and the speech level are estimated and compared with a threshold to determine whether speech is present or not. An example of a voice activity detector is disclosed in U.S. Pat. No. 6,427,134.

For instance in noisy environments it is hard to make a uniform parameter set-up for the voice activity detector. Therefore several voice activity detectors are needed, trimmed to the specific cases. For example in some modules you need to be sure that if there is speech it should be detected (echo canceller), but in other cases it is better to indicate no speech if the signal to noise ratio level is too low. The plurality of voice activity detectors put a load on the digital signal processors that have to take care of performing the various voice activity detection algorithms.

SUMMARY OF THE INVENTION

An object of the present invention is to complement existing voice activity detection taking into account the direction of the source of the sound.

In a first aspect, the invention provides a device for voice activity detection comprising a sound signal analyser arranged to determine whether a sound signal comprises speech.

According to the invention, the device further comprises a microphone system arranged to discriminate sounds emanating from sources located in different directions from the microphone system, so that sounds only emanating from a range of directions are included as signals possibly containing speech.

Suitably, the range of directions is directed in the direction of an intended user's mouth.

In one embodiment, the microphone system comprises two microphone elements separated a distance and located on a line directed in the direction of an intended user's mouth.

The range of directions may be defined as all sounds falling inside a cone with a cone angle $\alpha$, wherein $10° < \alpha < 30°$, and preferably, a is approximately 25°.

In another embodiment, the microphone system comprises three microphone elements separated a distance and located in a plane directed in the direction of an intended user's mouth.

Suitably, two of said three microphone elements are separated a distance and located on a line directed perpendicular to the direction of an intended user's mouth.

In another embodiment, the microphone system comprises four microphone elements located such that the fourth microphone is not located in the same plane as the three others.

The microphone elements may be directional with a pattern having maximal sensitivity in the direction of an intended user's mouth.

In still a further embodiment, the microphone system comprises one directional microphone element together with one or more other microphone elements to remove the uncertainty in the direction of the sound source. The directional microphone element may be used to measure the sound pressure level relative to the other microphone element.

In a second aspect, the invention provides a mobile apparatus comprising a device as mentioned above.

Suitably, the microphone elements are located at the lower edge of the apparatus.

In one embodiment, a plurality of microphone elements are located at the lower edge of the apparatus and at least one further microphone element is located at a distance from the lower edge.

The mobile apparatus may be a mobile radio terminal, e.g. a mobile telephone, a pager, a communicator, an electric organiser or a smartphone.

In a third aspect, the invention provides an accessory for a mobile apparatus comprising a microphone system as mentioned above.

Suitably, the direction of the range of directions is adjustable.

The accessory may be a hands-free kit or a telephone conference microphone.

In a fourth aspect, the invention provides a method for voice activity detection, including the steps of:

receiving sound signals from a microphone system arranged to discriminate sounds emanating from sources located in different directions from the microphone system;

determining the direction of the sound source causing the sound signals;

if the sounds emanate from a first range of directions, further analyse the sound to determine whether the sound signal comprises speech;

but if the sounds emanate from a second, different range of directions decide that the sound signal does not comprise speech.

Suitably, the first range of directions is directed in the direction of an intended user's mouth.

The first range of directions may be defined as all sounds falling inside cone with a cone angle $\alpha$, wherein $10° < \alpha < 30°$, and preferably $\alpha$ is approximately 25°.

In one embodiment, the microphone system comprises at least two microphone elements located at a distance from each other and located on a line directed in the direction of an intended user's mouth, said two microphone elements being separated a distance d, wherein the direction to the sound source $\theta$ is calculated as $$\theta = \arccos\frac{\Delta t \cdot v}{2 \cdot d}$$

where $\Delta t$ is the time difference between the sounds from the two microphone elements, v is the velocity of sound.

In another embodiment one directional microphone element is used together with one or more other microphone elements to remove the uncertainty in the direction of the sound source.

The directional microphone element may be used to measure the sound pressure level relative to the other microphone element The invention is defined in the attached independent claims 1, 12, 16, and 20, while preferred embodiments are set forth in the dependent claims.

BRIEF DESCRIPTION OF THE DRAWINGS

The invention will be described below in greater detail with reference to the accompanying drawings, in which.

DETAILED DESCRIPTION OF PREFERRED EMBODIMENTS

As mentioned briefly in the introduction, many signal processing algorithms, such as echo cancellation and background noise synthesis, used in phones and hands-free kits are based on the fact that the user is speaking or not. For example the speech codec is active when the near-end user is speaking and the background synthesis is active when the near-end user is silent. All these algorithms need good voice activity detectors (VAD) to perform well. An error in the detection can result in artefacts or malfunctions caused by divergence of the algorithms or other problems.

Existing voice activity detectors are directed to determine whether speech is present or not in a sound signal. However, in fact not all speech is interesting or relevant, but only the user's speech. All other speech, e.g. in a noisy environment with several persons speaking, could be ignored and regarded as just noise.

The present inventor has realised that a microphone system having some kind of directional sensitivity could be used to discriminate sound emanating from different sources located in different directions. Sound not emanating from the user can be declared as non-speech, and those signals do not have to be analysed with the conventional voice activity detectors.

The existing voice activity detectors may be conventional and are only referred to as a sound signal analyser in this application.

Figure 1:
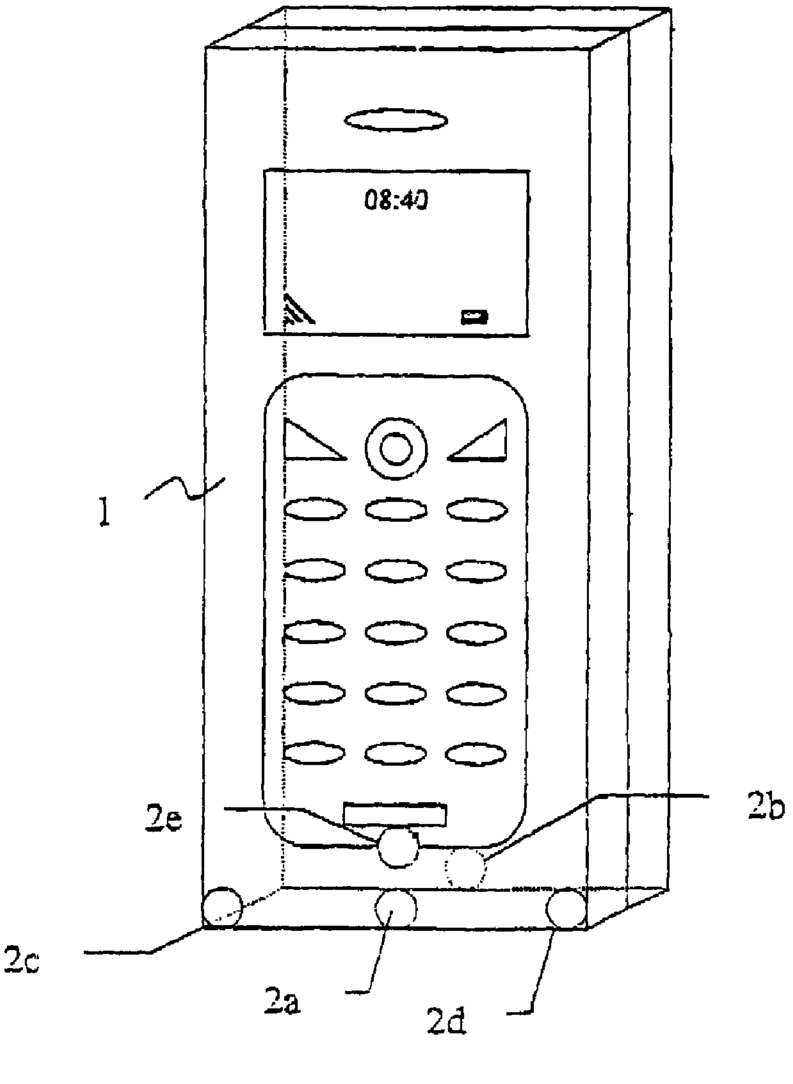
FIG. 1 is a perspective view of a mobile phone incorporating the present invention.

Generally, a microphone system having some kind of directional sensitivity can be used. FIG. 1 shows an example with at least two separate microphone elements.

A general mobile telephone is indicated at 1. The invention is equally applicable to other devices such as mobile radio terminals, pagers, communicators, electric organisers or smartphones. The common feature is that voice activity detection is employed, e.g. in connection with communicating speech or receiving voice commands by means of speech recognition.

In the simplest version, the microphone system comprises two microphones 2*a* and 2*b*. Suitably, they are located on a line directed in the calculated direction of an intended user's mouth. Suitably, the microphone elements are located at the lower edge of the mobile apparatus 1.

Figure 2:
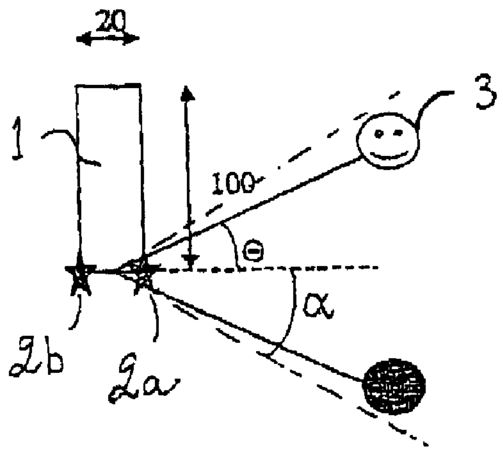
FIG. 2 is a schematic drawing of the receiving angle of an embodiment of the present invention.

FIG. 2 shows a schematic diagram of the calculation of the direction of the sound source, typically the user's mouth 3. In the case of two microphones, only the angle to the line on which the microphone elements are located can be determined. In other words, the direction of the sound source is on a cone with a cone angle θ. To calculate the angle θ, first a cross-correlation between the two signals from the microphones 2*a* and 2*b* is made. The maximum indicates the time difference Δt between the two microphones 2*a* and 2*b*. The distance between the two microphones 2*a* and 2*b* is e.g. 20 millimetres. The angle θ is calculated as $$\theta = \arccos\frac{\Delta t \cdot v}{2 \cdot d}$$

Note that arccos is only defined for arguments between −1 and 1. If the time difference is negative, this means that the angle is greater than 90° and the sound emanates from behind the apparatus.

Suitably, the device is adapted to determine that all sounds with an angle θ less than a fixed angle α are emanating from the user. The threshold angle α may be set within a range of e.g. 10° to 30°, suitably at 25°.

In the case of three microphones, the direction of the sound source can be further determined to be at two points (e.g. on the above cone). The three microphone elements are suitably located in a plane directed in the general direction of the user's mouth. In FIG. 1 microphone elements 2*b*, 2*c* and 2*d* are a possible set-up. The two microphone elements 2*c* and 2*d* at the front are located on a line perpendicular to the direction of the user's mouth, while the third microphone element 2*b* is located at the rear side.

In the case of four microphones (or more) detection of all direction angles may be calculated, provided that four microphone elements are located such that the fourth microphone is not located in the same plane as the three others, e.g. on a tetrahedron. A possible set-up is two microphone elements 2*c* and 2*d* at the front on the lower edge, while a third microphone element 2*b* is located at the rear side, and a fourth microphone element 2*e* is located at the front at a distance from the lower edge.

A similar microphone arrangement may be used in an accessory to a mobile apparatus, such as a hands-free kit or a telephone conference microphone system intended to be placed on a table. Apart from the microphone elements the logic circuitry may be located in the main/mobile apparatus. In this case the reception angle of the microphone system can be adjustable. This is useful e.g. when the microphone system is placed in a car, where the user can be seated either in the driver's seat or in the passenger's seat or even both the driver and the passenger may be speakers during the same call. The adjustment of the reception angle can be achieved mechanically or electronically, for example by beam forming or adaptation of the directional sensitivity of the microphone system To further enhance the sensitivity of the microphone system, directional microphone elements with a pattern having a maximum sensitivity in the direction of the user's mouth could be used.

In a further embodiment, one directional microphone element is used together with one or two other microphone elements (that may be non-directional). The directional microphone element is used to measure the sound pressure level relative to the other(s), thus removing the uncertainty in the direction of the sound source. Various combinations of directional microphone elements and non-directional microphone elements are possible.

The present invention leads to a voice activity detector having enhanced performance. With the present invention only one voice activity detector may be necessary throughout the whole signal path. This will in turn reduce the computational complexity, decreasing the load on the digital signal processors as well as improving the performance. It is especially favourable in environments with high background noise and noise with similar spectral properties as speech.

A person skilled in the art will realise that the invention may be realised with various combinations of hardware and software. The scope of the invention is only limited by the claims below.

The invention claimed is:

1. A device for voice activity detection, comprising:

a sound signal analyser configured to determine whether a sound signal comprises speech, comprising:

a microphone system configured to discriminate sounds emanating from sources located in different directions from the microphone system, wherein the microphone system is configured to determine the direction of a sound source causing a sound signal, is configured to further analyse the sound signal to determine whether the sound signal comprises speech when the sound signal emanates from a first range of directions, and is configured to determine that the sound signal does not comprise speech and perform no frequency spectral processing of the sound signal when the sound signal emanates from a second, different range of directions;

wherein the first range of directions is directed in a direction of an intended user's mouth.

2. A device according to claim 1, wherein the microphone system comprises two microphone elements separated a distance and located on a line directed in the direction of an intended user's mouth.

3. A device according to claim 2, wherein the first range of directions is defined as an area falling inside a cone with a cone angle $\alpha$, wherein $10° < \alpha < 30°$.

4. A device according to claim 3, wherein $\alpha$ is approximately 25°.

5. A device according to claim 1, wherein the microphone system comprises three microphone elements separated a distance and located in a plane directed in the direction of an intended user's mouth.

6. A device according to claim 5, wherein two of said three microphone elements are separated a distance and located on a line directed perpendicular to the direction of an intended user's mouth.

7. A device according to claim 1, wherein the microphone system comprises four microphone elements, located such that the fourth microphone is not located in the same plane as the three others.

8. A device according to claim 2, wherein the microphone elements are directional with a pattern having maximal sensitivity in the direction of an intended user's mouth.

9. A device according to claim 1, wherein the microphone system comprises one directional microphone element together with one or more other microphone elements configured to remove the uncertainty in the direction of the sound source.

10. A device according to claim 9, wherein the directional microphone element is configured to measure a sound pressure level relative to the other microphone elements.

11. A device according to claim 9, wherein the device is a mobile apparatus.

12. A mobile apparatus according to claim 11, wherein the microphone elements are located at a lower edge of the apparatus.

13. A mobile apparatus according to claim 11, wherein a plurality of microphone elements are located at the lower edge of the apparatus and at least one microphone element is located at a distance from the lower edge.

14. A mobile apparatus according to claim 11, wherein the mobile apparatus comprises a mobile radio terminal, a pager, a communicator, an electric organiser and/or a smartphone.

15. An accessory for a mobile apparatus, comprising:

a microphone system configured to discriminate sounds emanating from sources located in different directions from the microphone system, wherein the microphone system is configured to determine the direction of a sound source causing sound a sound, is configured to further analyse the sound signal to determine whether the sound signal comprises speech when the sound signal emanates from a first range of directions, and is configured to determine that the sound signal does not comprise speech and perform no frequency spectral processing of the sound signal when the sound signal emanates from a second, different range of directions;

wherein the direction of the first range of directions is adjustable.

16. An accessory according to claim 15, wherein the accessory is a hands-free kit.

17. An accessory according to claim 15, wherein the accessory is a telephone conference microphone.

18. A method for voice activity detection, comprising performing operations as follows such that at least a portion of at least one of the operations is performed on at least one processor:

receiving sound signals from a microphone system configured to discriminate sounds emanating from sources located in different directions from the microphone system;

determining the direction of the sound source causing the sound signals;

analyzing the sound signals to determine whether the sound signals comprise speech when the sound signals emanate from a first range of directions determining that the sound signals to do not comprise speech and performing no frequency spectral processing of the sound signals when the sound signals emanate from a second, different range of directions;

wherein the first range of directions is directed in the direction of an intended user's mouth.

19. A method according to claim 18, wherein the first range of directions is defined as an area falling inside a cone with a cone angle $\alpha$, wherein $10° < \alpha < 30°$.

20. A method according to claim 19, wherein $\alpha$ is approximately 25°.

21. A method according to claim 19, wherein the microphone system comprises at least two microphone elements located at a distance d from each other and located on a line directed in the direction of an intended user's mouth, wherein the direction to the sound source $\theta$ is calculated as $$\theta = \arccos\frac{\Delta t \cdot v}{2 \cdot d}$$

where $\Delta t$ is a time difference between the sounds from the two microphone elements, v is a velocity of sound.

22. A method according to claim 18, further comprising:

using one directional microphone element together with one or more other microphone elements to reduce uncertainty in the direction of the sound source.

23. A method according to claim 22, further comprising:

using the directional microphone element to measure a sound pressure level relative to the other microphone element.

* * * * *

UNITED STATES PATENT AND TRADEMARK OFFICE

CERTIFICATE OF CORRECTION

PATENT NO. : 7,966,178 B2
APPLICATION NO. : 10/561383
DATED : June 21, 2011
INVENTOR(S) : Gustavsson It is certified that error appears in the above-identified patent and that said Letters Patent is hereby corrected as shown below:

Title page:
Item (30) Foreign Application Priority Data: Please correct “03445076”
to read -- 03445076.7 --

Column 1, Line 63: Please correct “preferably, a” to read -- preferably, α --

Signed and Sealed this
Seventeenth Day of January, 2012

David J. Kappos

*Director of the United States Patent and Trademark Office*